United States Patent [19]

Chen et al.

[11] Patent Number: 5,780,545
[45] Date of Patent: Jul. 14, 1998

[54] STABLE RELEASE AGENTS

[75] Inventors: Jiann Hsing Chen; Robert Albert Guistina, both of Rochester; William Bernard Vreeland, Webster, all of N.Y.

[73] Assignee: Eastman Kodak Company, Rochester, N.Y.

[21] Appl. No.: 611,338

[22] Filed: Mar. 8, 1996

[51] Int. Cl.[6] .......................................... C08K 5/00

[52] U.S. Cl. .................. 524/860; 106/287.14; 430/124; 252/182.29

[58] Field of Search .............. 524/860; 106/287.14; 430/124; 252/182.29

[56] References Cited

U.S. PATENT DOCUMENTS

| | | | |
|---|---|---|---|
| 3,816,313 | 6/1974 | Szieleit | 252/49.6 |
| 4,029,827 | 6/1977 | Imperial et al. | 427/22 |
| 4,065,586 | 12/1977 | Eddy et al. | 427/22 |
| 4,170,957 | 10/1979 | Eddy et al. | 118/60 |
| 4,185,140 | 1/1980 | Strella et al. | 428/418 |
| 4,254,733 | 3/1981 | Namiki | 118/60 |
| 4,426,953 | 1/1984 | Kromm, Jr. et al. | 118/60 |
| 4,488,504 | 12/1984 | Vineski | 118/60 |
| 4,659,621 | 4/1987 | Finn et al. | 428/339 |
| 4,689,082 | 8/1987 | Dexheimer et al. | 106/38.22 |
| 4,770,116 | 9/1988 | Moser | 118/60 |
| 4,807,341 | 2/1989 | Nielsen et al. | 29/132 |
| 4,853,737 | 8/1989 | Hartley et al. | 355/289 |
| 4,952,657 | 8/1990 | Riding et al. | 528/27 |
| 4,970,559 | 11/1990 | Miyabayashi | 355/290 |
| 5,017,432 | 5/1991 | Eddy et al. | 428/422 |
| 5,025,074 | 6/1991 | Davis et al. | 528/15 |
| 5,039,772 | 8/1991 | Davis et al. | 528/15 |
| 5,041,514 | 8/1991 | Webb et al. | 528/25 |
| 5,157,445 | 10/1992 | Shoji et al. | 355/284 |
| 5,166,031 | 11/1992 | Badesha et al. | 430/124 |
| 5,233,008 | 8/1993 | Chen et al. | 525/33 |
| 5,248,339 | 9/1993 | Fitzgerald et al. | 118/60 |
| 5,281,506 | 1/1994 | Badesha et al. | 430/124 |
| 5,285,248 | 2/1994 | Menjo et al. | 355/284 |
| 5,395,725 | 3/1995 | Bluett et al. | 430/124 |

Primary Examiner—Margaret W. Glass
Attorney, Agent, or Firm—Anne B. Kiernan

[57] ABSTRACT

This invention provides a release agent consisting of a blend of non-poly(alkylene oxide)-functionalized poly (organosiloxane) fluid and poly(alkylene oxide)-functionalized poly(organosiloxane) fluid and an antioxidant which when used at elevated temperatures does not separate into two phases and does not cause an objectionable odor, or pump failure. The release agent is particularly suited for application to a fuser member for fusing toner images to a receiver.

14 Claims, No Drawings

STABLE RELEASE AGENTS

FIELD OF THE INVENTION

This invention relates to stable release agents or lubricants used in numerous industrial applications. More specifically, this invention relates to new stable release agents useful for application onto the surface of fuser members which are used to fuse toner to a receiver.

BACKGROUND

Conventional silicone fluids are widely applied to machine parts as lubricants and release aids, as well as cooling and heating media in numerous industrial applications. In some of these applications there is a gradual build up of charge on the machine part to which the silicone oil is applied, for example, on fuser members in electrostatographic machines. Fuser members which are typically two rollers in pressurized contact, at least one of which is heated, are used to melt or soften thermoplastic toner and thereby fuse the toner to the surface of a receiver in an electrostatographic machine. Because the toner is melted or softened, there is a tendency for the toner to stick to one or both of the fuser members. During the operation of the fuser members, there is also a buildup of charge on the fuser members which results in an electrical attraction of the receiver, e.g. a piece of paper, to the fuser members which hinders the release of the receiver from the fuser members. Release fluid is typically applied to at least one fuser member to assist the release of the toner and toner-bearing receivers from the fuser members. In some applications, to decrease or eliminate the buildup of charge on the fuser members, antistatic materials have been added to the release fluids. One such material added to the release fluid is a low molecular weight poly(ethylene oxide)-functionalized silicone fluid. The addition of the poly(ethylene oxide)-functionalized silicone fluid helps to prevent the buildup of unwanted charge; however, eventually it also results in the development of two phases in the release agent, objectionable odor, pump failure and eventual offset of the toner onto one or both of the fuser members.

Therefore, a need exists for providing improved release agents which prevent the buildup of unwanted charge, and which do not result in the development of two phases in the release agent, objectionable odor, pump failure, and eventual offset problems.

SUMMARY OF THE INVENTION

This invention provides a release agent comprising: non-poly(alkylene oxide)-functionalized poly(organosiloxane) fluid; poly(alkylene oxide)-functionalized poly(organosiloxane) fluid, and an antioxidant.

This invention further provides a fuser member for fusing toner images to a receiver, having a release agent applied to the surface of the fuser member, said release agent comprising: non-poly(alkylene oxide)-functionalized poly(organosiloxane) fluid; poly(alkylene oxide)-functionalized poly(organosiloxane) fluid, and an antioxidant.

The release agent of this invention provides for release of, for example, a receiver from fuser members while preventing the buildup of unwanted electrostatic charge. Further, this invention provides a release agent which does not breakdown into two phases, and does not cause an objectionable odor, pump failure, or eventual offset problems.

DETAILED DESCRIPTION OF THE INVENTION

This invention provides release agents useful for machine parts in numerous industrial applications, for example, fuser members. The release agents are fluids at elevated operating temperatures, for example, for a fuser member the operating temperature is typically 150° C. to 200° C., and preferably the release agents are fluids at room temperature. Herein, the terms fluid and oil have the same meaning and may be used interchangeably to describe the release agents or polysiloxanes used in this invention.

The inventors discovered upon analysis of the release agents comprising a blend of non-poly(alkylene oxide)-functionalized poly(organosiloxane) fluid and a poly(alkylene oxide)-functionalized poly(organosiloxane) fluid that had formed two phases that the components of the release agent were reacting in such a way that some of the poly(alkylene oxide)-functionalized poly(organosiloxane) was decomposing, thereby forming one phase containing poly(alkylene oxide), ethylene oxide, propylene oxide, and acid below the release agent phase. It was determined that this reaction was caused by peroxide, water and heat. After this analysis and experimenting, it was discovered that the addition of an antioxidant material would prevent the poly(alkylene oxide)-functionalized poly(organosiloxane) from decomposing into the polyalkylene oxide, ethylene oxide, propylene oxide, and acid.

The non-poly(alkylene oxide)-functionalized poly(organosiloxane) fluid used in the release agent of this invention is preferably poly(organosiloxane) fluid, which can be functionalized and can be a polymer of the same repeating monomer or can be a copolymer of two or more different repeating monomers, both referred to as "polymers". The polymers can be random or block copolymers. Functional groups, if present, can be terminal groups (also referred to as endcaps) or the functional groups can be located on a side chain off the silicone backbone. The non-poly(alkylene oxide)-functionalized poly(organosiloxane) fluids can be poly(alkylsiloxane), poly(arylsiloxane), poly(alkylarylsiloxane), poly(alkyl(aryl)siloxane), or any of the poly(siloxanes) just listed having functional groups. Such functionalized poly(siloxanes) include epoxy-functionalized, carboxyl-functionalized, polyether-functionalized, phenol-functionalized, amino-functionalized, alkoxy-functionalized, methacryl-functionalized, carbinol-functionalized, hydroxy-functionalized, vinyl-functionalized, acrylic-functionalized, silane-functionalized, trifluoro-functionalized, or mercapto-functionalized poly(organosiloxanes). The non-poly(alkylene oxide)-functionalized poly(organosiloxane) fluids useful in this invention can be prepared as described in numerous patents and publications. One method is by the catalyzed ring opening of octamethylcyclotetrasiloxane as described in for example, McGrath, et al, ACS Symposium Series 286, page 147, incorporated herein by reference. Other references which disclose the preparation of these fluids are Kirk-Othmer, *Encyclopedia of Chemical Technology*, 3rd Ed., Vol. 20, pp. 912–962 and U.S. Pat. Nos. 4,251,277 and 4,845,003, incorporated herein by reference. Many of the non-poly(alkylene oxide)-functionalized poly(organosiloxane) fluids useful in this invention are commercially available from, for example, General Electric, Dow Corning, and Petrarch.

The preferred non-poly(alkylene oxide)-functionalized poly(organosiloxane) polymers and random or block copolymers useful in this invention have the following structural formula:

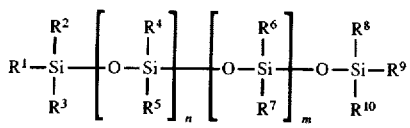

where $R^1$ to $R^{10}$ are independently hydrogen, alkyl having from 1 to 18 carbons, such as methyl, ethyl, propyl, butyl and the like; an aryl group having 6 to 18 carbons, such as phenyl, benzyl, napthyl, and the like; a mercaptoalkyl group having from 1 to 18 carbons, such as mercaptopropyl; an aminoalkyl group having from 1 to 10 carbons, such as aminopropyl or aminoisopropyl; trifluoroalkyl having 1 to 18 carbons, such as trifluoromethyl; or trifluoroaryl having 6 to 18 carbons, such as trifluoromethylphenyl, where n is preferably a number from 0 to 300, more preferably n is 50 to 200, and m is preferably a number from 1 to 300, more preferably m is 1 to 200. The viscosities of the non-poly (alkylene oxide)-functionalized poly(organosiloxane) polymers are preferably from 1 to 100,000 ctsk, more preferably 50 to 60,000 centistokes (ctsk) at 25° C. The preferred weight average molecular weight range for the non-poly (alkylene oxide)-functionalized poly(organosiloxane) polymers is 200 to 140,000, more preferably 4,000 to 120,000.

The more preferred non-poly(alkylene oxide)-functionalized poly(organosiloxane) polymers are poly(dimethylsiloxane), poly(diphenylsiloxane), poly(methylphenylsiloxane), poly(dimethyldiphenylsiloxane), mercaptopropyl-functionalized poly(dimethylsiloxane), aminopropyl-functionalized poly(dimethylsiloxane), carboxypropyl-functionalized poly(dimethylsiloxane), silane-functionalized poly(dimethylsiloxane), and trifluoropropyl-functionalized poly(dimethylsiloxane).

The most preferred non-poly(alkylene oxide)-functionalized poly(organosiloxane) polymers are trimethyl-terminated poly(dimethylsiloxane) (PDMS), that is, where $R^1$ to $R^{10}$ in Structure I are methyl and n+m is approximately 4 to 3,000, and trimethylsilyl-terminated poly(dimethyldiphenylsiloxane) where $R^1$ to $R^5$ and $R^8$ to $R^{10}$ in Structure I are methyl and $R^6$ and $R^7$ are phenyl, and n+m is approximately 4 to 3,000.

Mixtures of non-poly(alkylene oxide)-functionalized poly(organosiloxane) fluids can be used in the release agent. The most preferred poly(organosiloxane) fluids are non-functionalized PDMS fluids.

The poly(alkylene oxide)-functionalized poly(organosiloxane) fluids useful in this invention are preferably poly(alkylsiloxane), poly(arylsiloxane) and poly(alkylarylsiloxane) fluids with at least one poly(alkylene oxide) group substituted on one or both ends of the siloxane backbone or on a side chain off the siloxane chain or any combination of locations. Each poly(alkylene oxide) group can have 1 to 200 alkylene oxides, preferably 10 to 120 alkylene oxides most preferably 50 to 100 alkylene oxides bonded to each other. Examples of poly(alkylene oxide)-functionalized poly(organosiloxane) fluids include poly(alkylene oxide)-functionalized poly(dimethylsiloxane), poly(dimethyldiphenylsiloxane), or poly(methyloctylsiloxane), the most preferred being poly(alkylene oxide)-functionalized poly(dimethylsiloxane). The preferred poly(alkylene oxide)-functionalized polysiloxanes have the following structure:

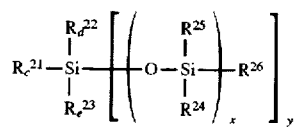

where $R^{21}$, $R^{22}$, $R^{23}$, $R^{24}$, and $R^{25}$ are independently alkyl, aryl, or alkylaryl having 1 to 18 carbons, preferably alkyl having 1 to 4 carbons, most preferably methyl, x is 7 to 100 and y is 1 to 3, and c, d and e are 0 or 1, and $R^{26}$ is a polyalkylene oxide group having one of the following structures: $-(OR^{28})_a(OR^{29})_bOR^{27}$, or

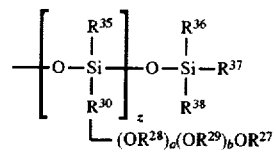

where $R^{28}$, $R^{29}$ and $R^{30}$ are independently alkylene groups having from 2 to 20 carbons, a is from 1 to 200, b is from 1 to 200, $R^{35}$, $R^{36}$, $R^{37}$ and $R^{38}$ are independently alkyl, aryl or alkylaryl having 1 to 18 carbons, preferably alkyl having 1 to 4 carbons, most preferably methyl, and $R^{27}$ is an alkyl having 1 to 20 carbons or hydrogen and z is 1 to 5, more preferably 1 to 3. It is preferred that $R^{28}$, $R^{29}$ and $R^{30}$ are alkylene groups having 1 to 5 carbons, and $R^{27}$ is hydrogen or methyl. Most preferably $R^{29}$ and $R^{30}$ are propylene and $R^{28}$ is ethylene, a is 20 to 70, and b is 10 to 40.

The preferred viscosity for the poly(alkylene oxide)-functionalized polysiloxane is 2 to 10,000 ctsk at 25° C., and the preferred weight average molecular weight for the poly(alkylene oxide)-functionalized polysiloxane is 400 to 62,000. The most preferred poly(alkylene oxide)-functionalized polysiloxane are polyethylene-copolypropylene-functionalized PDMS having the following structures.

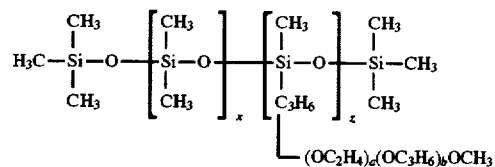

where x is 7 to 100, z is 1 to 3, a is 20 to 70, b is 10 to 40, and

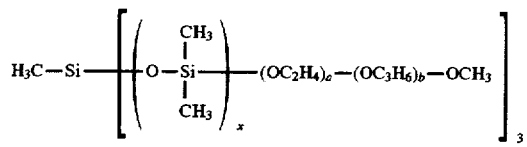

where x is from 7 to 100, a is 20 to 70, and b is 10 to 40.

The poly(alkylene oxide)-functionalized polysiloxanes can be prepared, for example, by the grafting of polyalkylene oxides onto a linear polydimethylsiloxane through a hydrosilation reaction. This process results in an alkyl-pendant copolymer in which the polyalkylene oxide groups are attached along the siloxane backbone. Alternatively, polyalkylene oxides can be reacted with a branched polydimethyl siloxane through condensation chemistry creating an alkoxy-terminated siloxane copolymer. Additional description and preparation methods are disclosed in the literature and known to a person of ordinary skill in the art. For example, see "Silicone Compounds Register and Review" Petrarch System, 1987, pp. 266–268, herein incorporated by reference.

The release agents of this invention comprise an antioxidant. The anitoxidants added to the release agents of this invention can be fluids or solids as long as the antioxidant can be blended and/or dispersed into the non-poly(alkylene oxide)-functionalized polysiloxane and poly(alkylene oxide)-functionalized polysiloxane. It is preferred that the antioxidant is a fluid at least at the operating temperature of the release agent.

The antioxidant preferably is a hydrogen-donating compound. Examples of useful antioxidants include hindered phenols, such as monophenolics, diphenolics, and polyphenolics, aromatic amines, such as alkylated phenylamines, hydroquinolines, dihydroquinones, diarylamines, hindered amines, divalent sulfur, such as thioethers, and trivalent phosphorus.

Examples of monophenolics include 2,6-di-tert-butylphenol; 2,6-di-tert-butyl-4-methylphenol; 2,6-di-tert-butyl-4-ethylphenol; 2,6-di-tert-butyl-4-nonylphenol; 2-tert-butyl-4,6-dimethylphenol; 2,4-bis|(octylthio)methyl|-6-methylphenol; styrenated phenol; 2,6-di-tert-butyl-4-sec-butylphenol; octadecyl 3,5-di-tert-butyl-4-hyroxyhydrocinnamate; N-stearolyl-p-aminophenol; 2,6-di-tert-butyl-4-(dimethylamino-methyl)phenol; 2,4,bis|n-octylthio-6-(4-hydroxy-3,5-di-tert-butylanilino)|1,3,5-triazine; 6-methyl-2,4-bis|(octylthio)methyl|-phenol; and isooctyl 3,5-di-tert-butyl-4-hydroxyhydrocinnamate, and tetrakis(methylene(3,5-di-t-butyl-4-hydroxyhydrocinnamate))methane.

Examples of diphenols include: 2,2'-methylene bis(4-methyl-6-tert-butylphenol); 2,2'-methylene bis(4-ethyl-6-tert-butylphenol); 4,4'-methylene bis(2,6-di-tert-butyl-phenol); 2,2'-ethylidene bis(4,6-di-tert-butyl-phenol); triethylene glycol bis(3-tert-butyl-4-hydroxy-5-methylhydrocinnamate); 4,4'-butylidene bis(6-tert-butyl-3-methylphenol); 4,4'-thio bis(6-tert-butyl-3-3-methylphenol); 4,4'-thio bis(2-methyl-6-tert-butyl-phenol); 1,6-hexamethylene bis(3,5-di-tert-butyl-4-hydroxyhydrocinnamate); thiodiethylene bis(3,5-di-tert-butyl-4-hydroxyhydrocinnamate); N,N'-hexamethylene bis (3,5-di-tert-butyl-4-hydroxyhydrocinnamide); calcium bis |0-ethyl(3,5-di-tert-butyl-4-hydroxybenzyl)phosphonate|; nickel bis|0-ethyl(3,5-di-tert-butyl-4-hydroxybenzyl) phosphonate|; 2,2'-oxamido bis ethyl(3,5-di-tert-butyl-4-hydroxyhydrocinnamate); N,N'-bis(3,5-di-tert-butyl-4-hydroxyhydrocinnamoyl)hydrazine; bis[3,3-bis(4-hydroxy-3-tert-butylphenyl)butanoic acid],glycol ester; and 2,2'-bis |4-2-3(3,5-di-tert-butyl-4-hydroxyhydrocinnamoyloxy) ethoxyphenyl|propane.

Examples of polyphenols include: butylated reaction product of p-cresol and dicyclopentadiene; tetrakis |methylene(3,5-di-tert-butyl-4-hydroxyhydrocinnamate)| methane; 1,3,5-trimethyl-2,4,6-tris-(3',5'di-tert-butyl-4'-hydroxybenzyl)benzene; 1,3,5-tris(3',5'-di-tert-butyl-4-hydroxybenzyl)isocyanurate; 3:1 condensate of 3-methyl-6-tert-butylphenol with crotonaldehyde; 3,5-di-tert-butyl-4-hydroxy-hydrocinnamic triester with 1,3,5-tris(2-hydroxyethyl)s-triazine-2,4,6-(1H,3H,5H)-trione; and 1,3,5-tris(4-tert-butyl-3-hydroxy-2,6-dimethylbenzyl)s-triazine-2,4,6-(1H,3H,5H)trione.

Examples of hydroquinones include: 2,5-di-tert-amylhydroquinone; tert-butylhydroquinone; and butylated hydroxyanisole.

Examples of diarylamines include: N-phenyl-α-naphthylamine; p-oriented styrenated diphenylamine; octy-lated N-phenyl-α-naphthylamine; octylated diphenylamines; and 4,4'-bis(α,α-dimethylbenzyl)diphenylamine.

Examples of alkylated p-phenylenediamines include: N-phenyl-N'-(1,3-dimethylbutyl)-p-phenylenediamine; N-phenyl-N'-isopropyl-p-phenylenediamine; N,N'-di-sec-butyl-p-phenylenediamine; N-phenyl-N'-(1-methylheptyl)-p-phenylenediamine; N-phenyl-N'-cyclohexyl-p-phenylenediamine; N,N'-diphenyl-p-phenylenediamine; N,N'-di-β-naphthyl-p-phenylenediamine; N,N'-bis(1,4-dimethylpentyl)phenylenediamine; N,N'-bis(1-ethyl-3-methylpentyl)-p-phenylenediamine; N-1,3-dimethylbutyl-N'-phenyl-p-phenylenediamine; N-N'-bis(1-methylheptyl)-p-phenylenediamine; and N-phenyl-N'-(p-toluenesulfonyl)-p-phenylenediamine.

Examples of dihydroquinolines include: polymerized 2,2,4-trimethyl-1,2-dihydroquinoline; 6-dodecyl-2,2,4-trimethyl-1,2-dihydroquinoline; and 6-ethoxy-2,2,4-trimethyl-1,2-dihydroquinoline.

Examples of thioethers include: dioctadecyldisulfide; didodecyl 3,3'-thiodipropionate; distearyl thiodipropionate; dimyristyl thiodipropionate; ditridecyl thiodipropionate; pentaerythritol tetrakis(3-dodecylthio)propionate; 2-mercaptoluimidazone; and zinc 2-mercaptotoluimidazole.

Examples of trivalent phosphorus compounds include: tris(nonylphenyl)phosphite; bis(2,4-di-tert-butylphenyl) pentaerythritoldiphosphite; distearyl pentaerythritoldiphosphite; tris(2,4,di-tert-butylphenyl)phosphite; tetrakis(2,4-di-tert-butylphenyl)-4,4'-biphenylene disphosphite; and 2,2'-ethylidene bis(4,6-di-tert-butylphenyl)fluorophosphite.

Examples of hindered amines include:

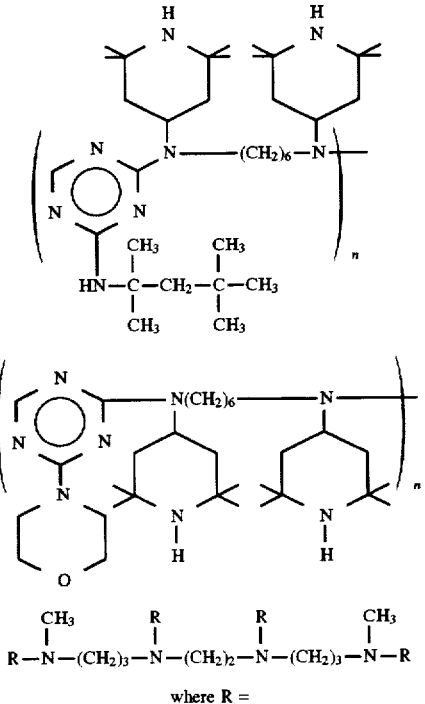

where R =

-continued

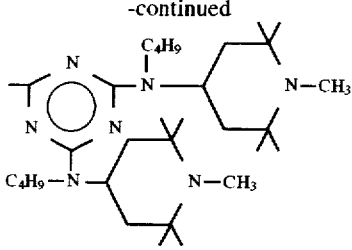

The preferred antioxidants are the hindered phenols including the mono, di and polyphenols listed above. A hindered phenol preferably has a bulky alkyl in the ortho position of a phenol. The preferred hindered phenols are monophenols, particularly those having the following structure:

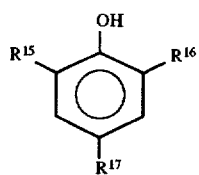

where $R^{15}$, $R^{16}$ and $R^{17}$ are independently alkyl groups, such as methyl, ethyl, propyl, isopropyl, butyl, tert-butyl, pentyl, hexyl, septyl, octyl, nonyl, decyl, and the like, and substituted alkyl groups, such as, alkylthioalkyl, and alkoxycarbonylethyl groups. The alkyl groups and substituted alkyl groups preferably have less than 30 carbons.

It is preferred that $R^{15}$, and $R^{16}$ are independently alkyl groups or substituted alkyl groups having from 3 to 10 carbons, and $R^{17}$ is an alkyl group or substituted alkyl group having from 3 to 12 carbons. More preferably $R^{15}$, and $R^{16}$ are independently tert-butyl, methyl or (otylthio)methyl. More preferably, $R^{17}$ is methyl, (octylthio)methyl, or isooctyloxycarbonylethyl.

The most preferred antioxidants are 2,6-di-tert-butyl-p-cresol; isooctyl 3,5-di-tert-butyl-4-hydroxyhydrocinnamate; and 2,4-bis[(octylthio)methyl]-o-cresol.

The antioxidants can be prepared by a person of ordinary skill in the art, or are commercially available. For example, 2,6-di-tert-butyl-p-cresol and other alkylated phenols can be made according to Stillson, U.S. Pat. No. 2,428,745; Kaminaka et al, U.S. Pat. No. 3,714,268; and Starnes et al, U.S. Pat. No. 3,541,171, hereby all incorporated herein by reference. Additionally tetrakis(methylene(3,5-di-t-butyl-4-hydroxyhydro-cinnamate))methane and similar compounds can be prepared according to Dexter et al, U.S. Pat. No. 3,644,482; and Takee et al, U.S. Pat. No. 5,081,280, both hereby incorporated herein by reference.

Mixtures of compatible antioxidants can be used in the release agents of this invention.

The release agents of the invention preferably comprise from 85% to 99.4% by weight non-poly(alkylene oxide)-functionalized poly(organosiloxane) fluid, from 0.5% to 5% by weight poly(alkylene oxide)-functionalized poly (organosiloxane), and from 0.1% to 10% by weight antioxidant, more preferably from 93% to 98.9% by weight of the non-poly(alkylene oxide)-functionalized poly (organosiloxane) fluid, from 1% to 2% by weight poly (alkylene oxide)-functionalized poly(organosiloxane), and from 0.1% to 5% by weight of antioxidant, most preferably the antioxidant is present from 0.1% to 1% by weight. The weight percentages are based on the total weight of the release agent.

To prepare the release agent of this invention, the non-poly(alkylene oxide)-functionalized poly(organosiloxane) fluid, poly(alkylene oxide)-functionalized poly (organosiloxane) fluid and antioxidant are blended by a gentle stirring, with or without a mechanical stirrer. Preferably, it will not be necessary to heat or mill the mixture in order to obtain a smooth, uniform product. The viscosity of the release agent is preferably between 1 and 100,000 ctsk, more preferably, 50 to 60,000 ctsk at 25° C.

The release agent of this invention is useful as a lubricant or release aid in many industrial applications. The most preferred application is as a release agent to prevent toner offset onto the surface of a fuser member. A fuser member is used for fusing toner images to a receiver, for example in electrophotographic or printing machines.

The fuser member to which the release agent of this invention is applied can be ol any known configuration. It can be a cylinder or a belt; it can be a heated member or a backup or pressure member. It can be internally or externally heated or unheated. The fuser member usually is part of a fuser assembly. The fuser assembly usually comprises a backup member, such as a roller or belt structure which cooperates with a heated fuser roller or belt to form a nip through which a receiver, such as copy paper or transparency passes so that toner images thereon contact the heated fuser roller or belt. The dimensions of the fuser assembly may be determined by one skilled in the art and generally are dictated by the requirements of the particular copying apparatus wherein the fuser assembly is employed. The dimensions are dependent upon the process speed and other parameters of the machine. Usually means are provided for applying a loading force to the fuser assembly to create nip pressure.

Fuser member materials include anodized aluminum and alloys thereof, steel, stainless steel, nickel, and alloys thereof, nickel plated copper, copper, glass, zinc, cadmium, and the like and various combinations of the above. These materials usually are coated with additional polymeric layers. The polymeric layers include such materials as silicones, fluoroelastomers, fluorosilicones and mixtures of such polymeric materials. Fuser members and coated fuser members have been disclosed in the prior art, for example see U.S. Pat. Nos. 5,480,725; 4,853,737; 5,362,833; 5,248,339; 4,257,699 and 4,272,179 incorporated herein by reference. Fuser members are commercially available from, for example, Eastman Kodak Co. The preferred fuser member for application of the release agent is described by Chen et al, in U.S. patent application Ser. No. 08/612,698 entitled "Fuser Member Having Fluoroelastomer Layer," filed on even date herewith and incorporated herein by reference.

The release agents of the present invention may be applied to the fuser member by any of the standard or conventional methods or devices known to those skilled in the art, and include application by wick, by padding, by brushes, by spraying, by wiper blade or the like. The release agent preferably is applied in an amount sufficient to cover the surface with a continuous film in order to provide the fuser member with a surface which releases heated thermoplastic resin toner. However, the release agent layer should not be so thick as to prevent heat transfer from the fuser member to the thermoplastic resin toner undergoing fusing upon a receiver. Generally, the release agent should be applied at a rate between 0.5 to 8 grams/copy, (copy is 8½-inch×11-inch sheet of paper) preferably 1 to 4 grams/copy.

During operating of any electrostatic reproducing apparatus, it is preferred to continuously apply the release agent onto the heated fuser member in order to replace any release agent which is retained by the receiver either by absorption or adherence of the release agent to the receiver. However, in embodiments where there is little or no loss of the release agent from the surface of the fuser member, continuous application of the release agent may not be necessary, and it may be preferred to utilize application techniques which only apply release agent intermittently to the surface.

The toner that is fused by the fuser member of this invention can be any known toner composition which is fused to a receiver by a fuser member. The toner can be comprised of a thermoplastic resin and other addenda including colorant such as dyes and/or pigments. An example of a conventional pigment is carbon black. Examples of binder polymers include vinyl polymers, such as homopolymers and copolymers of styrene and condensation polymers such as polyesters and copolyesters. Particularly useful binder polymers are styrene polymers of from 40 to 100 percent by weight of styrene or styrene homologs and from 0 to 45 percent by weight of one or more lower alkyl acrylates or methacrylates. Additional examples include polyesters of aromatic dicarboxylic acids with one or more aliphatic diols, such as polyesters of isophthalic or terephthalic acid with diols such as ethylene glycol, cyclohexane dimethanol and bisphenols. Patents describing toner compositions include U.S. Pat. Reissues 25,136 and 31,072; and U.S. Pat. Nos. 5,247,034; 4,160,644, 4,416,965; 4,624, 907; 4,814,250; 4,840,864; 2,659,670; 2,754,408; 2,788, 288, which are all incorporated herein by reference. Many useful toner compositions are known to a person of ordinary skill in the art and are available commercially.

The following examples illustrate the preparations of release agents of the invention and the ability of the release agents of the invention to remain unreactive and in a single phase.

EXAMPLE 1

Control: 0.2 grams of polyethylene-co-polypropylene functionalized PDMS, available from OSI Specialities, Inc. under the tradename Silwet L7002, was blended with 10 grams of PDMS oil, 60,000 ctsk at 25° C., available from Dow Corning under the tradename DC-200.

Release Agent 1 (RA1): 0.1 gram of 2,4-bis[(octylthio) methyl]-o-cresol available from Ciba-Geigy under the tradename Irganox 1520 was blended with the control composition.

Release Agent 2 (RA2): Same as RA1 except that 0.05 gram of Irganox 1520 was blended into the composition.

Release Agent 3 (RA3): Same as RA1 except that 0.01 gram of Irganox 1520 was blended into the composition.

The control and release agent compositions of the invention were tested for acid content and phase separation after exposure to different temperatures for extended periods of time, with and without the addition of water or an aqueous solution of peroxide to the release agent compositions. The acid content was determined by acid-base titration. The phase separation was determined by visual inspection. The results are listed in Table 1.

TABLE 1

Results of Example 1

| Composition | Temp. | Duration | Acid content by wt % | Phase Separation |
|---|---|---|---|---|
| RA1 | 25° C. | 96 hr. | <0.002% | No |
| RA1 | 65° C. | 96 hr | <0.002% | No |
| RA1 & 75 mg of water | 65° C. | 96 hr | <0.002% | No |
| RA1 & 50 mg of $H_2O_2$ (30%) | 65° C. | 96 hr | 0.017% | No |
| Control & 50 mg of $H_2O_2$ (30%) in water | 65° C. | 72 hr | 0.400% | Yes |
| Control & 75 mg of water | 65° C. | 72 hr | 0.310% | Yes |
| RA1 & 75 mg of water | 65° C. | 336 hrs | <0.02% | No |
| RA2 & 75 mg of water | 65° C. | 336 hrs | <0.02% | No |
| RA3 & 75 mg of water | 65° C. | 336 hrs | <0.02% | No |
| Control & 75 mg of water | 65° C. | 168 hrs | 0.15%% | Yes |

EXAMPLE 2

Release Agent 4 (RA4): 0.1 gram of isooctyl 3,5-di-tert-butyl-4-hydroxyhydrocinnamate available from Ciba-Geigy under the tradename Irganox L135 was blended with the control composition described in Example 1.

Release Agent 5 (RA5): Same as RA4 except that 0.05 gram of Irganox L135 was blended into the composition.

Release Agent 6 (RA6): Same as RA4 except that 0.01 gram of Irganox L135 was blended into the composition.

The release agent compositions were tested as described in Example 1 except that the acid content was measured using pH paper and the results are listed in Table 2.

TABLE 2

Results of Example 2

| Composition | Temp. | Duration | Acid content by wt % | Phase Separation |
|---|---|---|---|---|
| RA4 | 25° C. | 96 hr. | <0.02% | No |
| RA4 | 65° C. | 96 hr | <0.02% | No |
| RA4 & 75 mg of water | 65° C. | 96 hr | <0.02% | No |
| RA4 & 50 mg of $H_2O_2$ (30%) in water | 65° C. | 96 hr | <0.02% | No |
| RA4 & 75 mg of water | 65° C. | 14 days | <0.02% | No |
| RA5 & 75 mg of water | 65° C. | 14 days | <0.02% | No |
| RA6 & 75 mg of water | 65° C. | 14 days | <0.02% | No |

EXAMPLE 3

Release Agent 7 (RA7): 0.1 gram of 2,6-di-tert-butyl-p-cresol, BHT, available from Aldrich, was blended with the control composition described in Example 1.

Release Agent 8 (RA8): Same as RA7 except that 0.05 gram of BHT was blended into the composition.

Release Agent 9 (RA9): Same as RA7 except that 0.01 gram of BHT was blended into the composition.

The release agent compositions were tested as described in Example 2 and the results are listed in Table 3.

TABLE 3

Results of Example 3

| Composition | Temp. | Duration | Acid content by wt % | Phase Separation |
|---|---|---|---|---|
| RA7 | 25° C. | 96 hr. | <0.02% | No |
| RA7 | 65° C. | 96 hr | <0.02% | No |

TABLE 3-continued

Results of Example 3

| Composition | Temp. | Duration | Acid content by wt % | Phase Separation |
|---|---|---|---|---|
| RA7 & 75 mg of water | 65° C. | 96 hr | <0.02% | No |
| RA7 & 50 mg of H$_2$O$_2$ (30%) in water | 65° C. | 96 hr | <0.02% | No |
| RA7 & 75 mg of water | 65° C. | 14 days | <0.02% | No |
| RA8 & 75 mg of water | 65° C. | 14 days | <0.02% | No |
| RA9 & 75 mg of water | 65° C. | 14 days | <0.02% | No |

The invention has been described in detail with particular reference to a presently preferred embodiment, but it will be understood that variations and modifications can be effected within the spirit and scope of the invention.

we claim:

1. A release agent for use with a toner fuser member, said release agent comprising a blend of:

about 85% to 99.4% by weight based on 100% by weight of the blend of a non-poly(alkylene oxide)-functionalized poly(organosiloxane) fluid;

about 0.5% to 5% by weight based on 100% by weight of the blend of a poly(alkylene oxide)-functionalized poly (organosiloxane; and about 0.1% to 10% by weight based on 100% by weight of the blend of an antioxidant;

wherein said non-poly(alkylene oxide)-functionalized poly(organosiloxane fluid has the structure

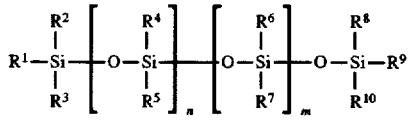

where $R^1$ to $R^{10}$ are each independently hydrogen, an alkyl group having from 1 to 18 carbons, an aryl group having from 6 to 18 carbons, a mercaptoalkyl group having from 1 to 18 carbons, an aminoalkyl group having from 1 to 10 carbons, a trifluoroalkyl group having from 1 to 18 carbons, or a trifluoroaryl group having from 6 to 18 carbons, n is from 0 to 300, and m is from 1 to 300; and wherein said poly(alkylene oxide)-functionalized poly (organosiloxane) has the structure

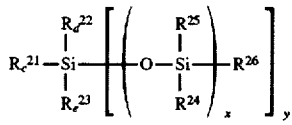

where $R^{21}$, $R^{22}$, $R^{23}$, $R^{24}$, and $R^{25}$ are each independently alkyl, aryl, or alkylaryl groups having 1 to 18 carbons, x is 7 to 100 and y is 1 to 3; c, d, and e are 0 or 1; c, d, e, and y together equal 4; and $R^{26}$ is a polyalkylene oxide group having the structure —$(OR^{28})_a(OR^{29})_bOR^{27}$, or

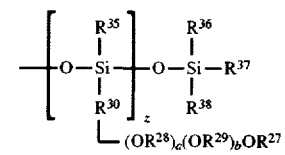

where $R^{28}$, $R^{29}$ and $R^{30}$ are each independently alkylene groups having from 2 to 20 carbons, a is from 1 to 200, b is from 1 to 200, $R^{27}$ is hydrogen or an alkyl group having 1 to 20 carbons, $R^{35}$, $R^{36}$, $R^{37}$ and $R^{38}$ are each independently alkyl, aryl, or alkylaryl groups having 1 to 18 carbons, and z is 1 to 5.

2. The release agent of claim 1 comprising a blend of from 93% to 98.9% by weight of said non-poly(alkylene oxide)-functionalized poly(organosiloxane) fluid, from 1% to 2% by weight said poly(alkylene oxide)-functionalized poly (organosiloxane), and from 0.1% to 5% by weight said antioxidant.

3. The release agent of claim 2 wherein said blend comprises from 0.1% to 1% by weight of said antioxidant.

4. The release agent of claim 1 wherein said non-poly (alkylene oxide)-functionalized poly(organosiloxane) fluid is selected from the group consisting of poly(alkylsiloxane), poly(arylsiloxane), poly(alkylarylsiloxane), poly(alkyl(aryl) siloxane), and epoxy-functionalized, carboxyl-functionalized, polyether-functionalized, phenol-functionalized, amino-functionalized, alkoxy-functionalized, methacryl-functionalized, carbinol-functionalized, hydroxy-functionalized, vinyl-functionalized, acrylic-functionalized, silane-functionalized, trifluoro-functionalized, or mercapto-functionalized poly(alkylsiloxane), poly(arylsiloxane), poly (alkylarylsiloxane), and poly(alkyl(aryl)siloxane) fluids.

5. The release agent of claim 1 wherein said non-poly (alkylene oxide)-functionalized poly(organosiloxane) fluid is selected from the group consisting of poly (dimethylsiloxane), poly(diphenylsiloxane), poly (methylphenylsiloxane), poly(dimethyldiphenylsiloxane), mercaptopropylfunctionalized poly(dimethylsiloxane), aminopropyl-functionalized poly(dimethylsiloxane), carboxypropyl-functionalized poly(dimethylsiloxane), silane-functionalized poly(dimethylsiloxane), and trifluoropropyl-functionalized poly(dimethylsiloxane).

6. The release agent of claim 1 wherein said non-poly (alkylene oxide)-functionalized poly(organosiloxane) fluid comprises poly(dimethylsiloxane), or poly (dimethyldiphenylsiloxane) having a viscosity from 1 to 100,000 ctsk at 25° C.

7. The release agent of claim 1 wherein said poly(alkylene oxide)-functionalized poly(organosiloxane) fluid is selected from the group consisting of poly(alkylene oxide)-functionalized poly(dimethylsiloxane), poly(alkylene oxide) -functionalized poly(dimethydiphenylsiloxane), and poly (alkylene oxide)-functionalized poly(methyloctylsiloxane) fluids.

8. The release agent of claim 1 wherein said poly(alkylene oxide)-functionalized poly(organosiloxane) is selected from the group consisting of:

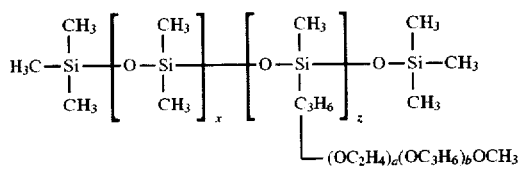

where x is 7 to 100, z is 1 to 3, a is 20 to 70, b is 10 to 40, and

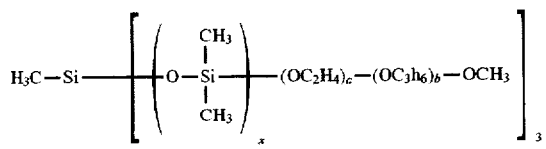

where x is 7 to 100, a is 20 to 70, and b is 10 to 40.

9. The release agent of claim 1 wherein said antioxidant is selected from the group consisting of monophenolics, diphenolics, polyphenolics, aromatic amines, hydroquinolines, dihydroquinones, diarylamines, hindered amines, divalent sulfur, and trivalent phosphorus compounds.

10. The release agent of claim 1 wherein said antioxidant are selected from the group consisting of 2,6-di-tert-butylphenol; 2,6-di-tert-butyl-4-methylphenol; 2,6-di-tert-butyl-4-ethylphenol; 2,6-di-tert-butyl-4-nonylphenol; 2-tert-butyl-4,6dimethylphenol; 2,4-bis|(octylthio)methyl|-6-methylphenol; styrenated phenol; 2,6-di-tert-butyl-4-sec-butylphenol; octadecyl 3,5-di-tert-butyl-4-hyroxyhydrocinnamate; N-stearolyl-p-aminophenol; 2,6-di-tert-butyl4-(dimethylamino-methyl)phenol; 2,4,bis|n-octylthio-6-(4-hydroxy-3,5-di-tert-butylanilino)|1,3,5-triazine; 6-methyl-2,4-bis|(octylthio)methyl|-phenol; and isooctyl 3,5-di-tert-butyl-4-hydroxyhydrocinnamate; 2,2'-methylene bis(4-methyl-6-tert-butylphenol); 2,2'-methylene bis(4-ethyl-6-tert-butylphenol); 4,4'-methylene bis(2,6-di-tert-butyl-phenol); 2,2'-ethylidene bis(4,6-di-tert-butylphenol); triethylene glycol bis(3-tert-butyl-4-hydroxy-5-methyl-hydrocinnamate); 4,4'-butylidene bis(6-tert-butyl-3-methylphenol); 4,4'-thio bis(6-tert-butyl-3-3-methylphenol); 4,4'-thio bis(2-methyl-6-tert-butyl-phenol); 1,6-hexamethylene bis(3,5-di-tert-butyl-4-hydroxyhydrocinnamate); thiodiethylene bis(3,5-di-tert-butyl-4-hydroxyhydrocinnamate); N,N'-hexamethylene bis (3,5-di-tert-butyl-4-hydroxyhydrocinnamide); calcium bis |0-ethyl(3,5di-tert-butyl-4-hydroxybenzyl)phosphonate|; nickel bis|0-ethyl(3,5-di-tert-butyl-4-hydroxybenzyl) phosphonate|; 2,2'-oxamido bis ethyl(3,5di-tert-butyl-4-hydroxyhydrocinnamate); N,N'-bis(3,5-di-tert-butyl-4-hydroxyhydrocinnamoyl)hydrazine; bis[3,3-bis(4-hydroxy-3-tert-butylphenyl)butanoic acid|,glycol ester, and 2,2'-bis |4-2-3(3,5-di-tert-butyl-4-hydroxyhydrocinnamoyloxy) ethoxyphenyl|propane; butylated reaction product of p-cresol and dicyclopentadiene; tetrakis|methylene(3,5-di-tert-butyl-4-hydroxyhydrocinnamate)|methane; 1,3,5-trimethyl-2,4,6-tris-(3',5'di-tert-butyl-4'-hydroxybenzyl) benzene; 1,3,5-tris(3',5'-di-tert-butyl-4-hydroxybenzyl) isocyanurate; 3:1 condensate of 3-methyl-6-tert-butylphenol with crotonaldehyde; 3,5-di-tertbutyl-4-hydroxyhydrocinnamic triester with 1,3,5-tris(2-hydroxyethyl)s-triazine-2,4,6-(1H,3H,5H)-trione; and 1,3,5-tris(4-tert-butyl-3-hydroxy-2,6-dimethylbenzyl)s-triazine-2,4,6-(1H, 3H,5H)trione.

11. The release agent of claim 1 wherein said antioxidant comprises the structure:

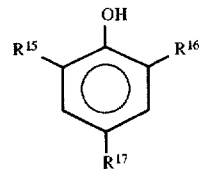

wherein $R^{15}$, $R^{16}$ and $R^{17}$ are independently alkyl groups alkylthioalkyl-substituted alkyl groups, or alkoxycarbonylethyl-substituted alkyl groups having less than thirty carbons.

12. The release agent of claim 1 wherein said antioxidant is selected from the group consisting of 2,6-di-tert-butyl-p-cresol; isooctyl 3,5-di-tert-butyl-4-hydroxyhydrocinnamate; and 2,4-bis|(octylthio)methyl|-o-cresol.

13. A fuser member for fusing toner images to a receiver, said fuser member having a release agent applied to a surface of said fuser member, said release agent comprising:
   about 85% to 99.4% by weight of a non-poly(alkylene oxide)-functionalized poly(organosiloxane) fluid;
   about 0.5 to 5% by weight of a poly(alkylene oxide)-functionalized poly(organosiloxane); and
   about 0.1% to 10% by weight of an antioxidant;
   wherein said non-poly(alkylene oxide)-functionalized poly(organosiloxane) fluid has the structure

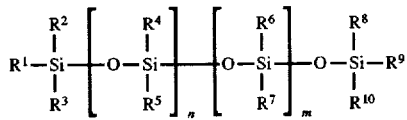

where $R^1$ to $R^{10}$ are each independently hydrogen, an alkyl group having from 1 to 18 carbons, an aryl group having from 6 to 18 carbons, a mercaptoalkyl group having from 1 to 18 carbons, an aminoalkyl group having from 1 to 10 carbons, a trifluoroalkyl group having from 1 to 18 carbons, or a trifluoroaryl group having from 6 to 18 carbons, n is from 0 to 300, and m is from 1 to 300; and wherein said poly(alkylene oxide)-functionalized poly (organosiloxane) has the structure

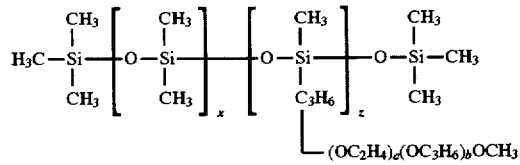

where x is 7 to 100, z is 1 to 3, a is 20 to 70, b is 10 to 40; and wherein said antioxidant is selected from the group consisting of: 2,6-di-tert-butyl-p-cresol, isooctyl 3,5-di-tert-butyl-4-hydroxyhydrocinnamate) and 2,4-bis| (octylthio)methyl|-o-cresol.

14. The fuser member of claim 13 wherein said non-poly (alkylene oxide)-functionalized poly(organosiloxane) fluid is selected from the group consisting of poly (dimethylsiloxane), poly(diphenylsiloxane), poly (methylphenylsiloxane), poly(dimethyldiphenylsiloxane), mercaptopropyl-functionalized poly(dimethylsiloxane), aminopropyl-functionalized poly(dimethylsiloxane), carboxypropyl-functionalized poly(dimethylsiloxane); silane-functionalized poly(dimethylsiloxane), and trifluoropropyl-functionalized poly(dimethylsiloxane); wherein said poly(alkylene oxide)-functionalized poly (organosiloxane) comprises the following structure:

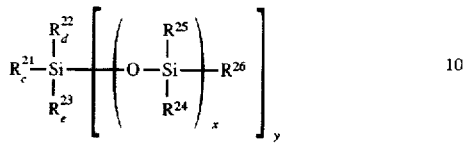

where $R^{21}$, $R^{22}$, $R^{23}$, $R^{24}$, and $R^{25}$ are alkyl, aryl, or alkylaryl having 1 to 18 carbons; x is 7 to 100 and y is 1 to 3; c, d and e are 0 or 1; c, d, e and y together equal 4 and $R^{26}$ is a polyalkylene oxide group having one of the following structures: $-(OR^{28})_a(OR^{29})_bOR^{27}$, or

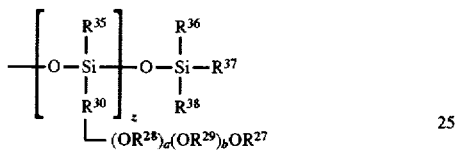

where $R^{28}$, $R^{29}$ and $R^{30}$ are independently alkylene groups having from 2 to 20 carbons, a is from 1 to 200, b is from 1 to 200, and $R^{27}$ is an alkyl having 1 to 20 carbons or hydrogen, $R^{35}$, $R^{36}$, $R^{37}$ and $R^{38}$ are independently alkyl, aryl or alkylaryl having 1 to 18 carbons, and z is 1 to 5; and wherein said antioxidant comprises the structure:

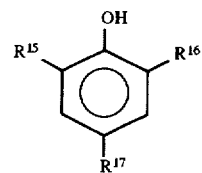

where $R^{15}$, $R^{16}$ and $R^{17}$ are independently alkyl groups, having less than 30 carbons.

* * * * *